April 28, 1931.  F. E. BLANCHARD  1,802,698
CONFECTION
Filed May 2, 1927

INVENTOR:
Frank E. Blanchard,
BY
ATTORNEY

Patented Apr. 28, 1931

1,802,698

UNITED STATES PATENT OFFICE

FRANK E. BLANCHARD, OF CHICAGO, ILLINOIS

CONFECTION

Application filed May 2, 1927. Serial No. 188,126.

My invention relates to a confection.

The object of my invention is to provide a confection having a rigid edible casing and a filling of soft edible material.

Another object is to provide a confection in which the edible filler is contained in a continuous closed chamber.

Another object is to provide a confection that will be easy and clean to handle while eating the same.

Another object is to produce and manufacture a confection cheaply and conveniently.

According to the invention, the confection consists of a substantially rigid casing having a continuous compartment filled with a soft moldable substance, all of which is edible, and which has a hole through the body thereof.

The drawing illustrates an embodiment of the invention and the views are as follows.

Figure 1:
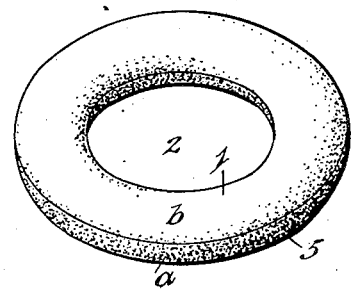
Fig. 1 is a perspective view of the confection.
Figure 4:
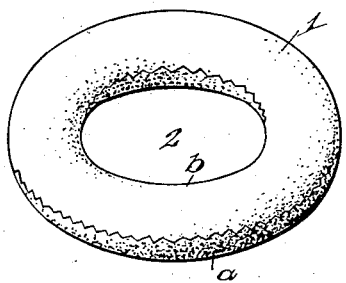
Fig. 4 is a modified form of casing section having serrated edges.
Figure 2:
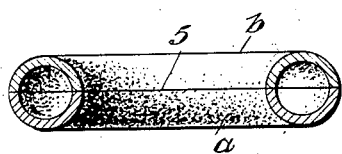
Fig. 2 is a transverse sectional view.

The confection comprises a casing 1 having an opening 2 through the body thereof. This casing may be square, circular, triangular, or other shape and may be formed in half sections $a$ and $b$ as shown in Figs. 1, 2 and 4. These half sections when placed together form an annulus into which an edible substance 3 is first introduced before the sections are placed together, or a complete single annular casing may be formed and a hole made therein to insert the filling.

The casing may be made of flour batter, gelatine compound, chocolate or any substance which is edible and which will provide a casing of sufficient rigidity to retain the filler and withstand ordinary handling.

Figure 3:
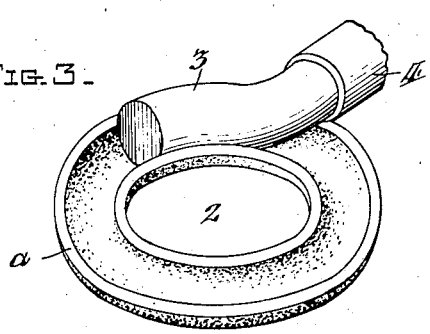
Fig. 3 is a perspective view of one half of the enclosing casing showing a method of introducing the filling.

If desired, the filling may be placed in one of the casing sections with a utensil 4 the end of which is shown in Fig. 3.

When the casing section is filled the filling stream may be broken off and the other casing section applied to close the same and thereby form a finished confection ready for consumption.

If desired, the joint 5 between the casing sections $a$ and $b$ may be sealed with a glutinous compound, chocolate or the like to securely hold the sections together and prevent any foreign substances from coming in contact with the semi-soft filling.

The edges of the casing sections may be serrated, scalloped, or otherwise patterned so that the opposing sections may fit more securely and snugly together.

The filling 3 may be of any edible substance of such consistency that it may be molded or pressed into the continuous chamber, such, for instance, as ice cream, whipped cream, chocolate fudge, peanut butter, gelatine compounds, jellies, or the like.

The casings may be filled as required for consumption, or may be filled and stocked, care being had to place meltable substances in proper refrigerators to retain the filling in semi-solid condition.

Figure 5:
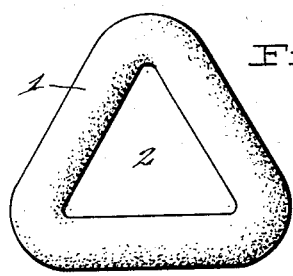
Fig. 5 is a modified shape of confection.
Figure 6:
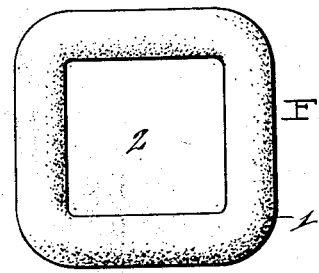
Fig. 6 is another modification.

Figs. 5 and 6 show triangular and substantially square shaped casings having an opening through the center thereof and a recessed or hollow section forming a continuous chamber to receive the filler.

Figure 7:
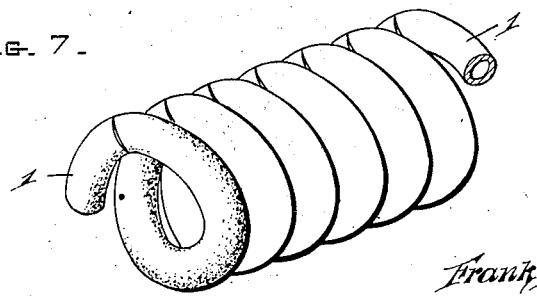
Fig. 7 shows a spiral casing which may be utilized for forming the ring like members.

Fig. 7 shows a continuous molded spiral each complete convolution of which may be cut and the ends joined together to produce ring-like members, which, when hardened by baking or otherwise, may have a hole punched in the same through which a filling may be introduced to the annular chamber.

The confection, when manufactured according to my invention with the filling reposing within the continuous chamber may be eaten in a clean and sanitary manner without smearing the lips and cheeks with the contents as the continuous chambered casing provides a section which the consumer may bite as desired while the contents beyond the point of severance will be retained wholly within the casing.

When substances which are inherently adhesive such as ice cream, caramel or the like are used as a filler, no binder for the edges of the sectional casing will be necessary.

The confection may be readily formed in public places such as refreshment stands and ice cream booths and a tool or utensil, the end of which is shown in Fig. 3 may be utilized for inserting an ice cream or other filler.

The section of the annulus may be round, square or any shape desired.

Of course, the invention is capable of wide modification and variation from the forms illustrated and described without departing from the spirit and scope of the claims.

I claim:

1. A confection comprising a casing formed of two annular grooved sections providing a continuous chamber, and a filling of edible material in said chamber.

2. A confection comprising an edible casing formed of two sections having a hole through the same and providing an endless closed chamber around the hole, edible material in said chamber, and means for securing said sections together.

In witness whereof I have hereunto subscribed my name.

FRANK E. BLANCHARD.